No. 726,188. PATENTED APR. 21, 1903.
A. POHORZELECK.
MACHINE FOR MAKING WICKERWORK.
APPLICATION FILED FEB. 21, 1902.
NO MODEL. 4 SHEETS—SHEET 4.
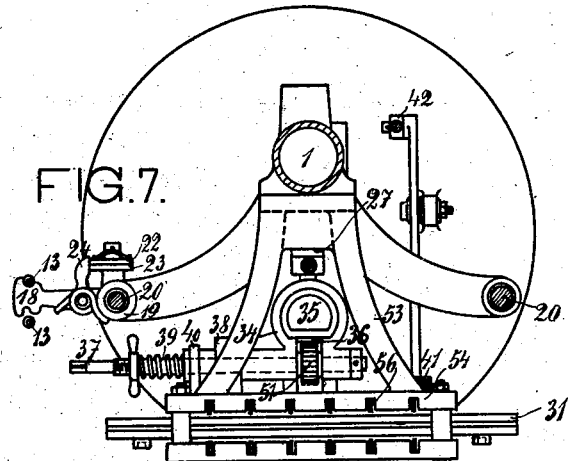
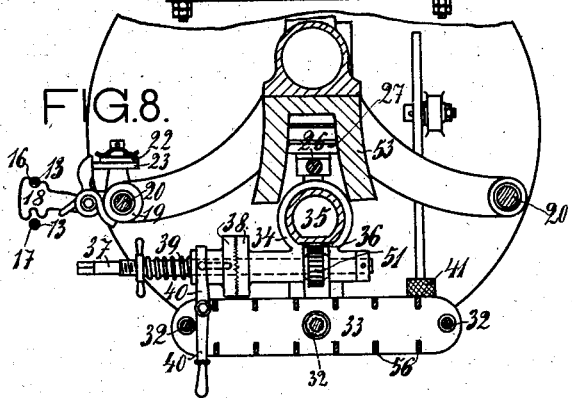
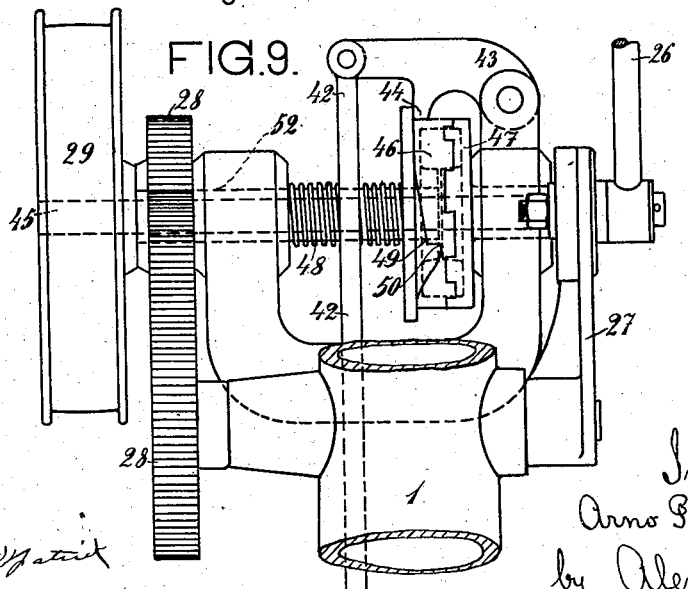
Witnesses
Inventor
Arno Pohorzeleck
by Alexander & Co
Attorneys

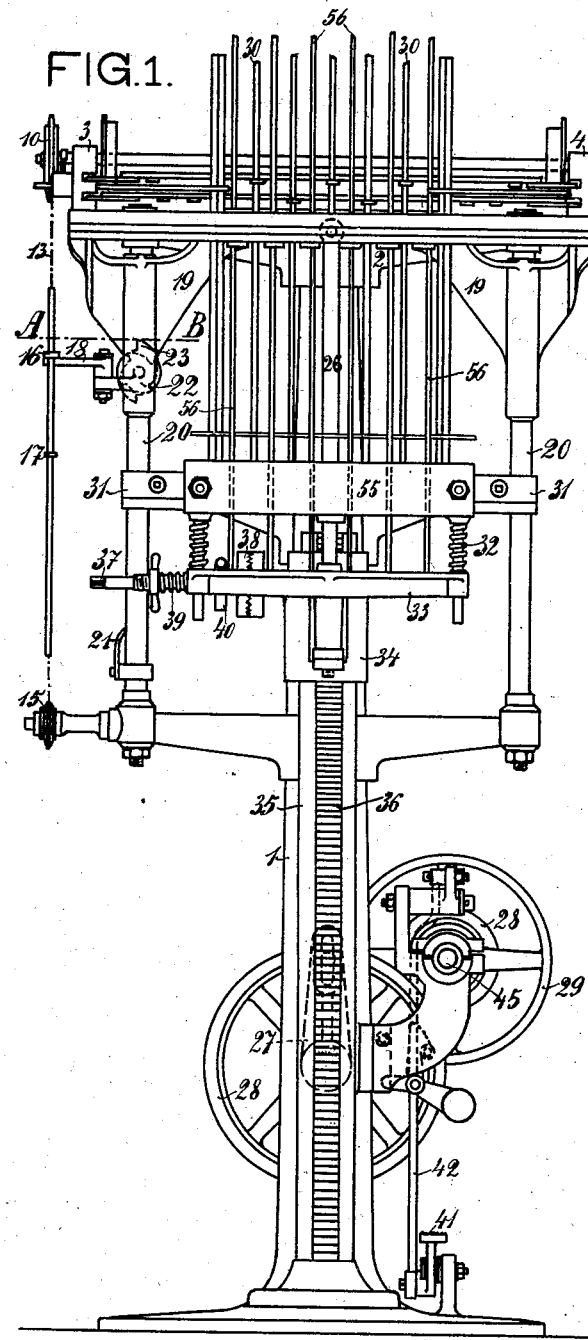

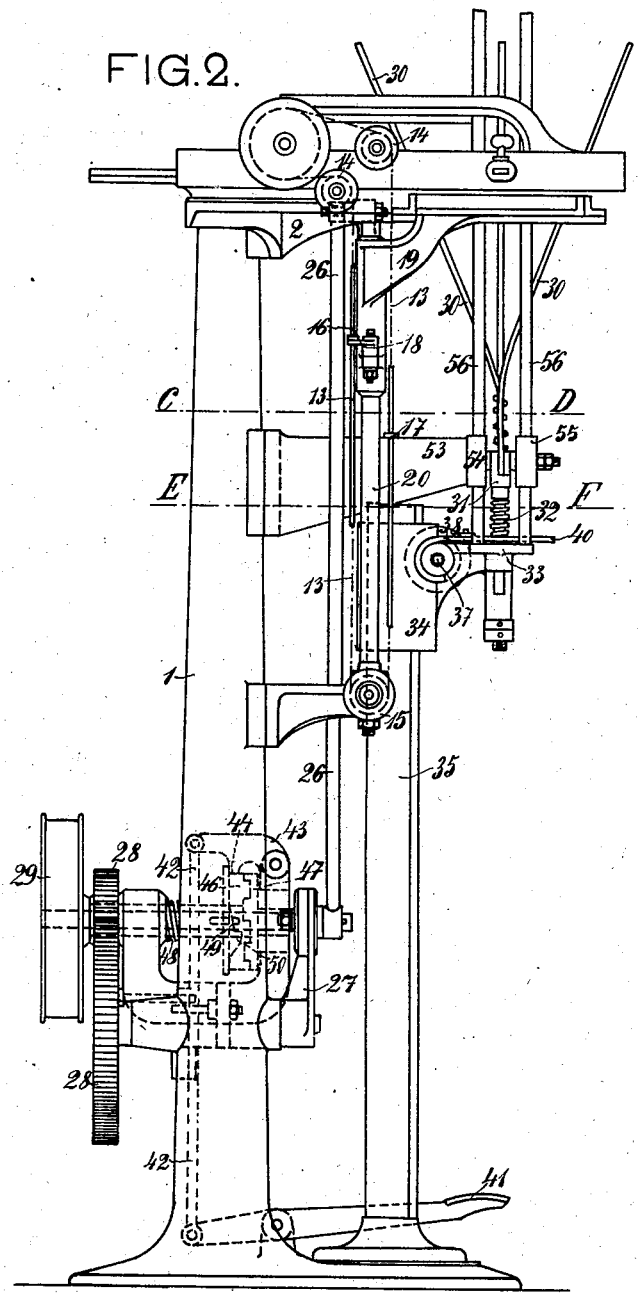

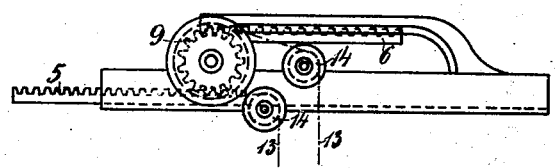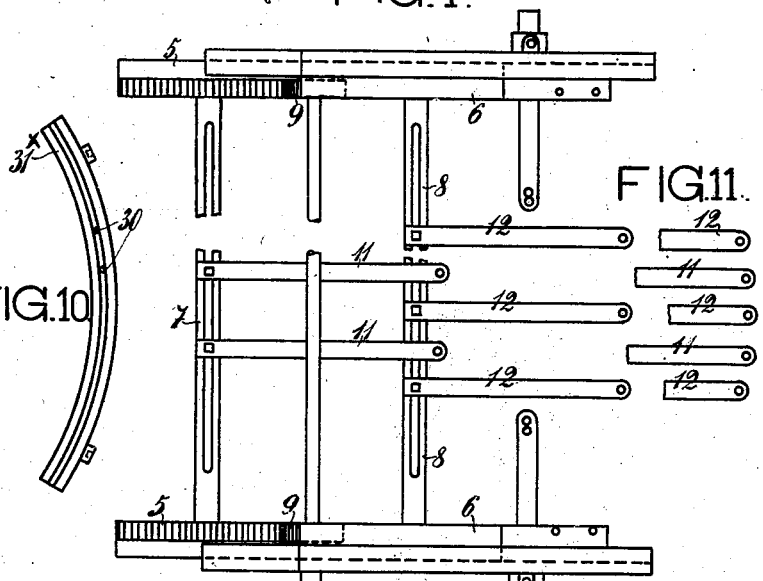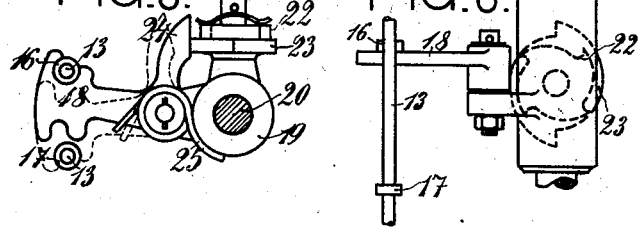

UNITED STATES PATENT OFFICE.

ARNO POHORZELECK, OF OSCHATZ, GERMANY.

MACHINE FOR MAKING WICKER-WORK.

SPECIFICATION forming part of Letters Patent No. 726,188, dated April 21, 1903.

Application filed February 21, 1902. Serial No. 95,053. (No model.)

*To all whom it may concern:*

Be it known that I, ARNO POHORZELECK, a subject of the King of Saxony, residing at Oschatz, in the Kingdom of Saxony and Empire of Germany, have invented new and useful Improvements in Machines for Making Wicker-Work, of which the following is a specification.

My invention relates to improvements in machines designed for making wicker-work.

In a machine constructed according to my said invention the shed of stakes wherein the withes are laid is formed by guides having a to-and-fro movement imparted to them to bring the stakes alternately to one or the other side, the withes laid in either by hand or by mechanical means being automatically beaten home by the mechanism. This arrangement is particularly adapted for making basket-bottoms, hurdles, and, in general, flat wicker-work of any size.

The machine is represented in the accompanying drawings.

Figure 1 is a front view, and Fig. 2 a side view, of this machine. Fig. 3 is a side view of the rack-and-pinion mechanism for actuating the transverse bars and guide-rods designed to form the shed. Fig. 4 is a plan thereof. Fig. 5 is a section on the line A B of Fig. 1, showing a plan of the device for alternately operating the rack-and-pinion mechanism through an endless chain. Fig. 6 is a side elevation of the same. Fig. 7 is a section on the line C D of Fig. 2. Fig. 8 is a section on the line E F of Fig. 2. Fig. 9 is a side elevation showing the driving device of the machine. Fig. 10 is a plan of a clamp having curved jaws. Fig. 11 is a plan of two sets of guide-rods for the stakes, the eyes of said rods being arranged in a curve to correspond to the curve of the clamp in Fig. 10.

Upon the stand 1 is provided a head 2 with lateral horizontal guides 3 and 4, in which racks 5 and 6 are adapted to slide. The racks 5 are connected with each other by longitudinally-slotted transverse bars 7 and the racks 6 by longitudinally-slotted transverse bars 8. Between the two racks 5 and 6 are toothed pinions 9, mounted upon the same shaft as the sprocket-wheel 10 and driven through the latter in such a manner that the racks will move every time in opposite directions, and the laterally-adjustable guide-rods 11 or 12, bolted adjustably at one end in the slots of the transverse bars 7 and 8, will, by apertures furnished in their ends, hold the stakes 30 alternately in one or the other direction, so that the withes may be laid into the shed thus formed.

I effect the oscillating movement of the sprocket-wheel 10 by an endless chain 13, which passes over the guide-rolls 14 and 15. On one of the rising parts of the chain are arranged the stops 16 and on the other the stops 17, against which an arm 18 strikes alternately. The arm 18, Figs. 5 and 6, is secured to the beating-frame 19, adapted to be moved up and down and to beat home the withes laid in the shed. The beating-frame 19 is guided by the rods 20. In proximity to the lower end of one of these rods 20 there is a pawl 21, Fig. 1, which in the downward movement of the beating-frame 19 causes the ratchet-wheel 22 to advance one tooth. By this means now the receding parts and then the projecting parts of the cam-disk 23 are caused to pass to the horizontal position and within reach of the nose 24, pressed by a spring 25 against the cam-disk 23. Thus in one upward movement of the beating-frame the arm 18 will strike against the stops 16, while in the next upward movement it will strike against the stops 17 of the chain 13, thereby causing now the racks 5 and then the racks 6, together with the stakes connected to them, to be pushed forward or pulled back. The movement of the beating-frame 19 takes place through the agency of the connecting-rods 26 from the crank 27, which is actuated by the pair of toothed wheels 28 from the pulley 29 on the driving-shaft by means of a coupling arranged to be thrown into gear.

One end of the stakes 30 is held in a clamp 31, which, by means of springs 32, bears upon the transverse bar 33. The springs 32 have for their object to render the blow produced by the beating-frame 19 elastic. The transverse bar 33 is mounted on a slide 34, which can be moved up and down in a sliding-wedge guide of the stand 35, the slide 34, Fig. 8, being held by a toothed pinion 51, supported therein and engaging the rack 36 of the stand 35. Upon the shaft 37 of this toothed pinion 51 is arranged a friction-coupling 38, consisting of two parts. The halves of this coupling 38, one of which is firmly connected with the slide 34, are forced against each other by the spring 39, the tension of which may be adjusted, thereby regulating at the same time the vehemence with which the beating-frame strikes upon the withes. On the frame delivering a blow upon the withes the clamp 31 is pushed downward, together with the transverse bar 33, in proportion as the wicker-work is being made, overcoming the friction between the halves of the coupling 38. By a disengaging device 40 the parts of the coupling may be kept asunder when the clamp 31, which has moved down in the making of the wicker-work, is to be raised again on finishing the same, in which case the slide 34 is moved up by turning the shaft 37 to rotate pinion 51, which engages and actuates the rack 36. The withes are beaten home when the shed is closed.

The device for driving the machine is thrown into gear by the foot-lever 41 and kept in gear as long as the foot-lever 41 is depressed. This lever 41 raises a rod 42, which causes a one-armed lever 43, provided with a nose 44, Fig. 9, to swing. On the driving-shaft 45 are arranged the two halves 46 and 47 of the coupling, which are pressed against each other by a spring 48. One half, 46, of the coupling presents a helical face 49, which when the foot-lever 41 is released and the nose 44 has consequently descended strikes against the latter, thereby lifting the half 46 of the coupling off the half 47. This having taken place the stop 50 on the helical face 49 strikes against the side of the nose 44 and the coupling remains disengaged. When, however, the foot-lever 41 is depressed, the nose 44 moves upward and the halves 46 and 47 are thrown into gear by the springs 48.

While one half, 47, of the coupling is mounted with the driving-belt pulley 29 on the same shaft 45, the other half, 46, turns with the toothed wheel 28 upon a sleeve 52, slid upon the shaft 45, the half 46 and sleeve 52 being adapted to be displaced relatively to each other in the axial direction by the insertion of a sliding wedge.

In order that the finished portion of the wicker-work shall not be bent out laterally by the blow of the beating-frame 19, especially when it has already attained to a comparatively great height, the following arrangement is made: Brackets 53 on the stand 1 serve to hold guides 54 and 55 at such a height that they cannot be reached by the beating-frame 19 in its lowest position. In the incisions of the guides 54 and 55 are held iron guide-bars 56, which are fixed by their lower end to the transverse bar 33 and must therefore follow the up and down movements thereof. The iron bars 56 are placed edgewise opposite the finished portion of the wicker-work and prevent any lateral bending of the same through the beating home of the withes.

For the manufacture of curved basket bottoms, lids, and hurdles the jaws of the clamp $31^\times$ for holding the lower ends of the stakes are curved, Fig. 10, the eyes at the ends of the guide-rods 11 and 12 being arranged to conform to the same curve, Fig. 11.

What I claim as my invention, and desire to secure by Letters Patent, is—

1. In a machine for making wicker-work the combination of a clamp adapted to hold one end of the stakes, sets of guide-rods having eyes for the passage of the stakes, and movable back and forth across the plane of the clamp, and two transverse bars to each of which a set of guide-rods is attached, and means for reciprocating the bars simultaneously in opposite directions; substantially as set forth.

2. In a machine for making wicker-work, the combination with a yieldingly-supported clamp for one end of the stakes and a beater movable toward and from the clamp, of oppositely-reciprocating sets of guide-rods having eyes for the passage of the stakes and means for operating said guide-rods, substantially as described.

3. In a machine for making wicker-work, the combination with a spring-supported clamp for one end of the stakes, and a frictionally-held sliding support on which said clamp is supported, of a beater movable toward and from the clamp and guide above the beater-rods reciprocating in opposite directions across the plane of the clamp and means for operating said guide-rods, substantially as described.

4. In a machine for making wicker-work the combination of a clamp adapted to hold one end of the stakes, sets of guide-rods having eyes for the passage of the stakes and movable back and forth across the plane of the clamp, two transverse bars to each of which a set of guide-rods is attached, a pair of alternating rotary pinions, pairs of racks connected by the respective transverse bars and gearing with opposite sides of said pinions for reciprocation in opposite directions thereby; substantially as set forth.

5. In a machine for making wicker-work the combination of a clamp adapted to hold one end of the stakes, sets of guide-rods having eyes for the passage of the stakes, two transverse bars to each of which a set of guide-rods is attached, a pair of alternating rotary pinions, pairs of racks to which the respective transverse bars are attached and gearing with opposite sides of the pinions for reciprocation in opposite directions thereby, a sprocket-wheel fixed on the shaft of the latter, an endless chain and means for imparting to-and-fro movement to said chain; substantially as set forth.

6. In a machine for making wicker-work the combination of a clamp adapted to hold one end of the stakes, sets of guide-rods having eyes for the passage of the stakes, two transverse bars slotted for adjustably securing the guide-rods, racks to which the transverse bars are secured, pinions gearing each with two of said racks arranged on opposite sides thereof, a sprocket-wheel fixed on the shaft of said pinions, an endless chain having stops on opposite parts thereof, a beating-frame adapted to receive to-and-fro movement, guide-rods for said frame, a pawl secured to one of the guide-rods, a ratchet-wheel, a cam-wheel, a nose and an arm extending between the opposite parts of said endless chain and adapted to engage the stops thereon, substantially as set forth.

7. In a machine for making wicker-work the combination of a clamp adapted to hold one end of the stakes, a stand, a rack, a slide on said stand, a pinion supported in the slide and engaging the rack, a transverse bar secured to said slide, a spring bearing upon the transverse bar and supporting said clamp, a coupling, one half of which is fixed to slide and the other half movable on the shaft of said pinions, an adjustable spring bearing against the movable half of the coupling, and a disengaging-lever arranged to operate said movable half, substantially as set forth.

8. In a machine for making wicker-work the combination of a clamp adapted to hold one end of the stakes, a stand, a rack, a slide on said stand, a pinion supported in the slide and engaging the rack, a transverse bar secured to the slide, a spring bearing upon the transverse bar and supporting said clamp, a coupling, one half of which is fixed to the slide and the other half movable on the shaft of said pinion, an adjustable spring bearing against said movable part, a beating-frame adapted to slide on guide-rods, and means for imparting a to-and-fro movement to said frame, substantially as set forth.

9. In a machine for making wicker-work the combination of a stand, transverse guides held by brackets on said stand, a stand having a rack, a slide provided with a pinion engaging this rack, a transverse bar secured to the slide, vertical guide-bars fixed in the transverse bar and passing through said guides, substantially as set forth.

In testimony whereof I have signed my name to this specification in the presence of two subscribing witnesses.

ARNO POHORZELECK.

Witnesses:
RUDOLPH FRICKE,
B. H. WARNER, Jr.